United States Patent [19]

Tiemann

[11] 4,245,250
[45] Jan. 13, 1981

[54] SCAN CONVERTER FOR ULTRASONIC SECTOR SCANNER

[75] Inventor: Jerome J. Tiemann, Schenectady, N.Y.

[73] Assignee: General Electric Company, Schenectady, N.Y.

[21] Appl. No.: 75,255

[22] Filed: Sep. 13, 1979

Related U.S. Application Data

[63] Continuation of Ser. No. 853,347, Nov. 21, 1977, abandoned.

[51] Int. Cl.³ .......................... H04N 5/02; G01S 7/10; G01S 9/68; H01B 10/00
[52] U.S. Cl. .................................... 358/140; 358/112; 343/55 C; 343/5 DP; 367/11; 367/97; 367/117; 128/653
[58] Field of Search .................. 358/112, 140; 73/620, 73/629, 67.8 S, 67.8 R; 343/55 C, 5 DP; 367/7, 11, 97, 117, 113; 128/653, 659

[56] References Cited

U.S. PATENT DOCUMENTS

| | | | |
|---|---|---|---|
| 3,653,044 | 3/1972 | Breeze et al. | 343/5 DP |
| 3,765,018 | 10/1973 | Heard et al. | 358/140 |
| 3,858,085 | 12/1974 | Dildy, Jr. et al. | 343/5 DP |
| 4,002,827 | 1/1977 | Nevin et al. | 358/140 |
| 4,058,001 | 11/1977 | Waxman | 358/112 |
| 4,111,055 | 9/1978 | Skidmore | 358/112 |
| 4,135,140 | 1/1979 | Buchner | 358/112 |
| 4,159,462 | 6/1979 | Rocha et al. | 367/97 |
| 4,167,753 | 9/1979 | Lynk | 358/112 |

OTHER PUBLICATIONS

Zehner: "Core Memory Digital Signal Processing Applied to Improved Sonar Displays", pp. 579–580, IEEE Trans. on Comm. V-Com-19, Aug. 1971.

*Primary Examiner*—Howard W. Britton
*Assistant Examiner*—Edward L. Coles
*Attorney, Agent, or Firm*—Donald R. Campbell; Marvin Snyder; James C. Davis

[57] ABSTRACT

The input data format in a single-sector or multi-sector scanner imaging system is chosen such that angulated scan lines intersect a lateral line at equal increments, and along the scan lines the echo signal is sampled at different rates whereby sampling points are along parallel raster lines. Successive scan lines are stored in adjacent columns of a row-column oriented digital memory. Echo data is read out of memory row by row at a variable rate to convert the read-out data back to sector geometry. The image is displayed in real time in a cathode ray tube.

8 Claims, 7 Drawing Figures

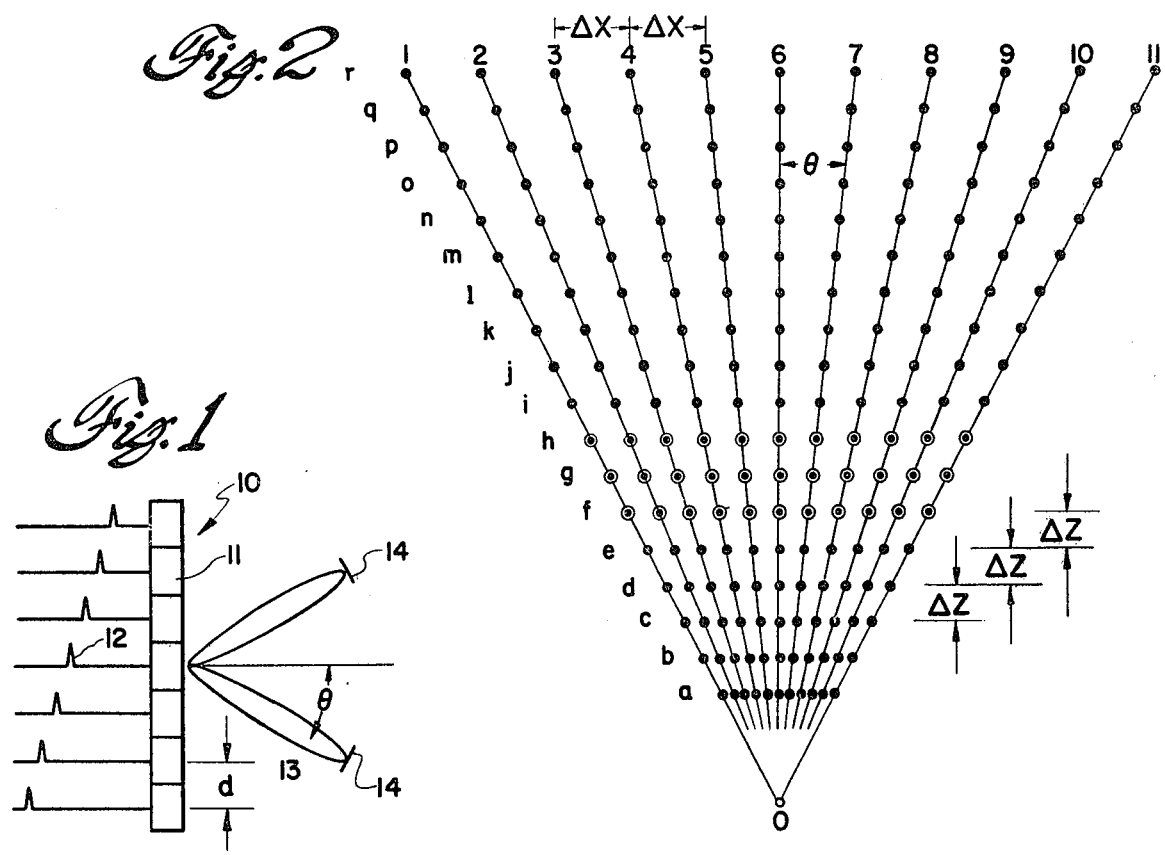
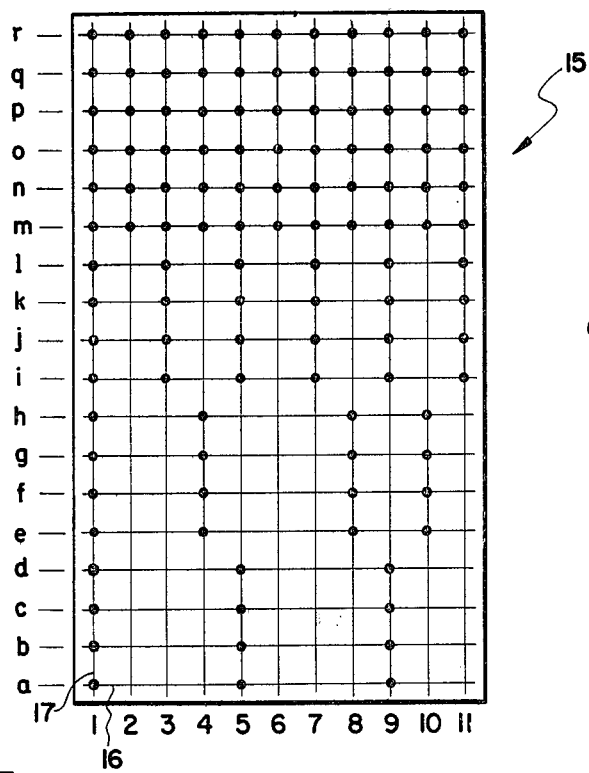
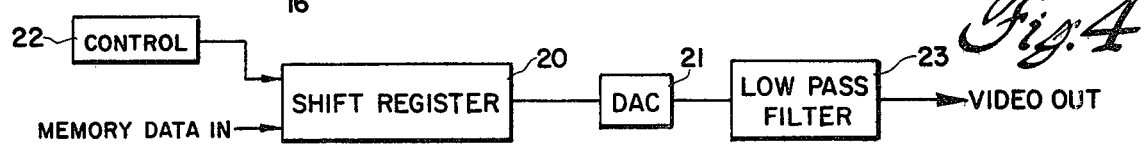

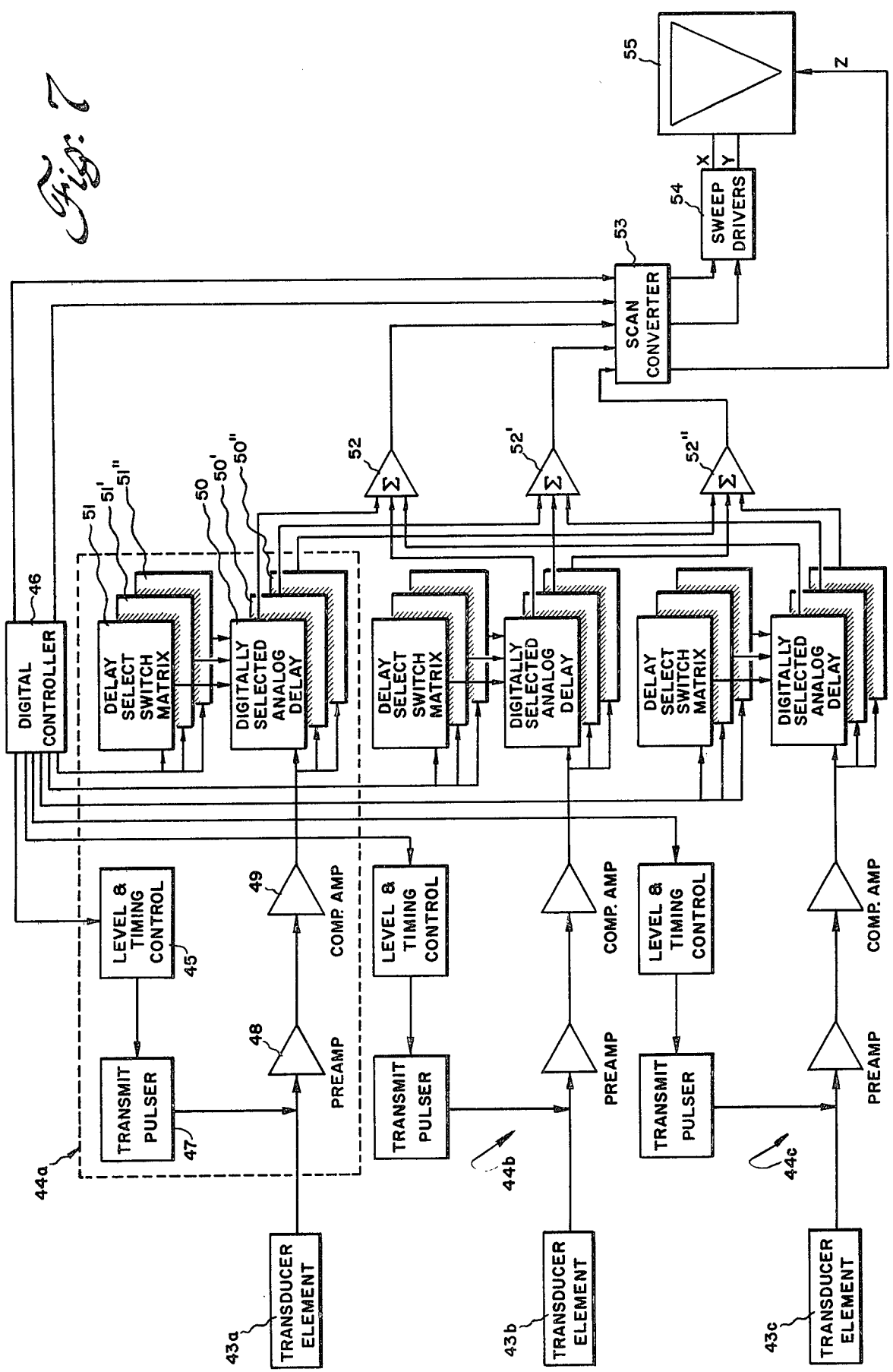

SCAN CONVERTER FOR ULTRASONIC SECTOR SCANNER

This is a continuation of application Ser. No. 853,347, filed Nov. 21, 1977, now abandoned.

BACKGROUND OF THE INVENTION

This invention relates to scan conversion apparatus and a method for converting data sensed in sector format to raster format for display. More particularly, the invention relates to a scan converter and method for a single-sector or multi-sector ultrasonic scanner for sampling and storing the received echo data in a raster type geometry and processing the read-out data for display on a cathode ray tube (television monitor).

Conventional analog scan converters employ delicate electron beam storage tubes which are both expensive and difficult to maintain. Many previous attempts to implement a digital scan converter have either been very expensive or have introduced objectionable errors in the display resulting in degraded image quality. The basic reason for the poor image quality of such previous implementations is that the locations of the input data samples have not corresponded to those of the output data in a manner that permits a simple interpolation to obtain the correct output data. That is, the physical locations of the input data are not related to those of the output data of the scan converter in a simple way.

The single-sector scanner ultrasonic imager is a real time imaging system having a linear transducer array as depicted in FIG. 1. To make a sector scan the elemental transducers are excited in linear time sequence to generate angulated acoustic beams at many different angles relative to the normal to the array at the midpoint. Echoes returning from targets in the direction of the transmitted acoustic beam arrive at the transducer elements at different times necessitating relative delaying of the received echo electrical signals by different amounts to focus the received echoes, and the delayed echo signals are summed before being fed to the scan converter. It is common in prior art single-sector scanners to rotate the angulated transmitted beam by equal scan angle increments, and in the scan converter to sample the focused echo signals at equal time intervals so that the data samples are along arcs concentric to the origin point. The cathode ray tube, on the other hand, is a rectangular grid type display. The function of the scan converter is therefore relatively complex and a picture of uneven quality often results, worsened by the tendency of the eye to focus on uneven areas. A single-sector steered beam cardiac scanner with a TV monitor display is described by Thurstone and von Ramm in "A New Ultrasounc Imaging Technique Employing Two-Dimensional Electronic Beam Steering", *Acoustical Holography*, Vol. 5, 1974, Plenum Press, New York, pp. 249–259.

The present invention is applicable also to the multisector or "walking beam" ultrasonic imaging system having a longer linear transducer array for producing a set of sector scans with the points of the sequential sector scans displaced longitudinally along the array. This real time systrem capable of imaging randomly oriented targets and producing improved images is disclosed and claimed in U.S. Pat. No. 4,159,462, H. A. F. Rocha and C. E. Thomas, entitled "Ultrasonic Multi-Sector Scanner". A scan converter operative to store and read out only the largest echo amplitude at image points in overlapping areas of the sector scans is disclosed and claimed in allowed copending application Ser. No. 825,529 filed on Aug. 18, 1977 by E. T. Lynk entitled "Peak Detecting Digital Scan Converter" now U.S. Pat. No. 4,167,753. Both applications are assigned to the same assignee as this invention.

SUMMARY OF THE INVENTION

In order to provide correct output echo amplitude data for display in raster scan format, the input sector geometry is somewhat changed. The scan angles of the acoustic scan lines are chosen so that they intersect a lateral line at equal increments, i.e., the scan angles have equal tangent increments. Along each of these lines the focused echo signal is sampled and converted to digital format at a rate that varies with scan angle so that corresponding samples are arranged in parallel rows or raster lines, i.e., the sampling rate varies inversely with the cosine of the angle of the scan line. Digitized echo data is written scan line by scan line into a digital memory having a matrix of storage cell locations in rows and columns, but is read out of memory raster line by raster line. In the preferred embodiment, the data is written into adjacent columns of a random access memory whereby data for a raster line is stored in a row of memory, and then is read out row by row in sequence. To convert back to sector geometry, the digital echo samples are read out into a shift register or other buffer storage, and are clocked out of the shift register at a variable rate dependent on the width of the sector at the raster line being read out and delayed in time dependent on the location of the edge of the sector from the side of the television screen or other reference line. These data are passed through a digital-to-analog converter and a low pass filter to produce the video output signal which is fed to a cathode ray tube to control the electron beam intensity.

Memory is required only in the amount needed to store the input digital echo data, as compared to prior art techniques in which there is a memory location for every image pixel. For instance, a 32 K memory is sufficient for a conventional TV raster of 400 lines with 300 picture elements each or 120 K pixels. For improved efficiency and real time imaging, the memory is operated in burst mode with alternate reading in and reading out, and the memory is divided into segments to facilitate writing of echo data in parallel into the segments and reading out in parallel into a like number of output buffer shift registers. Some sampling points can be skipped to avoid high rates of clocking out data in parallel from the shift registers. These data will be "filled in" by the action of the low pass filter at the output.

The digital scan conversion apparatus and method of converting ultrasound echo signals for raster scan display are described with regard to real time single-sector and multisector cardiology and laminography imaging systems.

BRIEF DESCRIPTION OF THE DRAWINGS

FIG. 1 is a sketch illustrating operation of a singlesector steered beam ultrasonic scanner;

FIG. 2 is an enlarged view of the acoustic scan lines of the sector scanner on which data sample points, located on lateral raster lines designated by letters, are shown as large dots;

FIG. 3 is a schematic plan view of a segment of the scan converter random access memory showing the pattern of stored echo amplitude data;

FIG. 4 is a simplified block diagram of the electronics for processing echo data read out of memory;

FIG. 7 is a functional block diagram of a single-sector scanner imaging system incorporating the scan converter.

DESCRIPTION OF THE PREFERRED EMBODIMENTS

Figure 5:
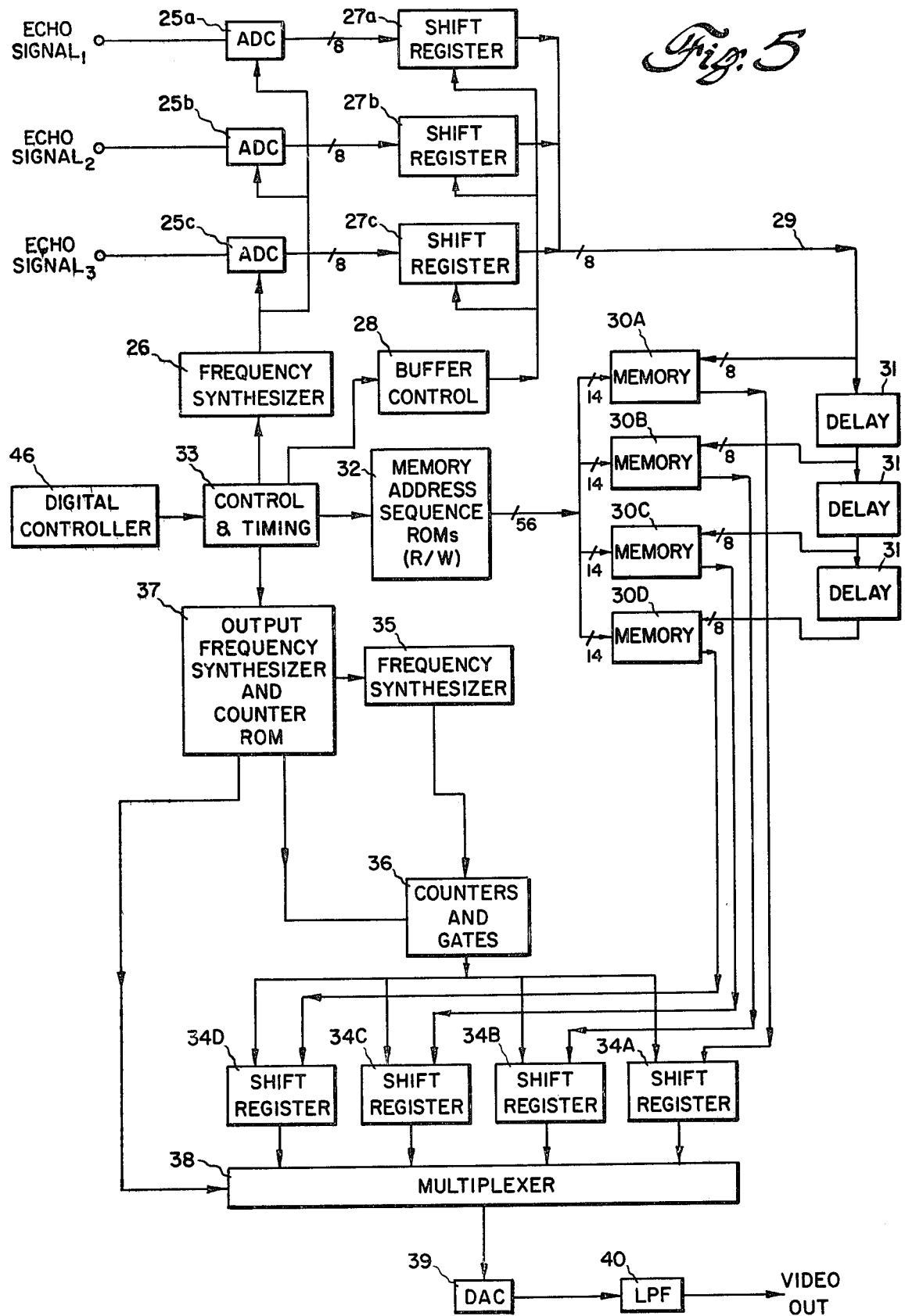
FIG. 5 is a system block diagram of the preferred embodiment of the complete scan converter.

To facilitate conversion of ultrasound echo data derived by single sector scanning for real time display on a conventional television monitor, the format of the sector is somewhat changed. The scan angles are chosen so that the acoustic scan lines intersect a lateral line at equal increments, and along each of these scan lines a focused received echo signal is sampled at a rate that varies with the scan angle. Corresponding data samples are taken at the same value of the z-axis coordinate, whereby the samples are arranged in a number of rows parallel to one another and the linear transducer array. Successively sampled scan lines are buffered and stored in a digital memory in adjacent columns of a row-column oriented memory. Thus, memory is required only in the amount needed to store the input data, and the only storage cell locations that are unused are those intentionally skipped where the input data near the sector origin is too dense to be processed at reasonable rates and viewed as individual pixels. For readout, all data samples in a row and corresponding to a single value of the z-axis coordinate are read into a shift register buffer, which is then clocked out at a rate corresponding to the sector width at that value of z. These data are fed to an analog-to-digital converter, whose output is low pass filtered and presented to the display. Modifications of the foregoing preferred embodiment of the scan converter will be discussed subsequently.

The single-sector steered beam ultrasonic scanner in FIG. 1 has a linear transducer array 10 comprised of equally spaced elementary transducers 11 which are energized by excitation pulses 12 in a linear time sequence to form an ultrasound beam 13 and direct the beam in a preselected azimuth direction to transmit a pulse of ultrasound. In order to steer the beam electronically to an angle $\theta$ from the normal to the array longitudinal axis, a time delay increment $T_i=(i-1)d \sin \theta/c$, where c is the acoustic velocity, is added successively to each ith element signal as one moves down the array from one end (i=1) to the other (i=N) to exactly compensate for the propagation path time delay differences that exist under plane wave (Fraunhofer) conditions. By progressively changing the time delay between successive excitation pulses, the angle $\theta$ at one side of the normal is changed by increments. To form and steer the beam at the other side of the normal, the timing of excitation pulses 12 is reversed so that the bottom transducer in FIG. 1 is energized first and the top transducer is energized last. The total sector scan angle is approximately 60° to 90°. Echoes returning from targets 14 in the direction of the transmitted beam arrive at transducer elements 11 at different times necessitating relative delaying of the received echo electrical signals by different amounts so that all the signals from a given point target are summed simultaneously by all elements of the array. The time delays of the transducer element echo signals are the same as during the transmission operation, to compensate for acoustic path propagation delay differences. The linear transducer array is also known as a phased array. For further information refer to "Electronic Scanning of Focused Arrays" by V. G. Welsby, *Journal of Sound Vibration* (1968), Vol. 8, No. 3, pps. 390–394.

For real time imaging at a typical frame rate of 30 frames per second, the system also requires a television monitor on which the total image is built up line by line from the scan converter memory. From the foregoing description, it is seen that an electronically controlled, steered ultrasound beam is generated that is capable of oscillating or rotating motion about the sector origin at the midpoint of the linear transducer array. For each transmitted steered ultrasound beam, there is a corresponding focused received echo electrical signal which is fed to the digital scan converter and is data for the corresponding image line. A single sector image depicting a tomographic slice of the insonified object region is displayed in real time on the screen of the television monitor. This is further explained in detail later with regard to FIG. 7. The single-sector scanner has both industrial and medical applications, and is especially advantageous in medical diagnostics for cardiology and laminography. To image a portion of a heart, linear transducer array 10 is manually held against the patient's chest wall while observing the image on the cathode ray tube, and its position is changed until the desired portion of the heart is imaged. A frame rate of at least 30 frames per second is needed to prevent blurring of the image due to heart motion. Assuming that a maximum image depth of 20 centimeters is required or a round trip of 40 centimeters, and that the velocity of sound in tissue is 150,000 centimeters per second, the rate of generating steered acoustic beams is limited to about 3,000 per second. For a good image there should be between 200 and 300 scan lines on the television screen, and 300 lines at 3,000 per second translates to a frame rate of 10 frames per second. To obtain 30 frames per second, then, there should be three focused received echo signals per transmitted acoustic beam. This is accomplished by forming the transmitted acoustic beam using fewer transducer elements than are used to receive the echoes. The transmitting beam lobe is three times as wide, in the direction of the longitudinal axis of the transducer array, as the "receiving beams" or focused echoes; that is, the "receiving beams" are steered or focused within the lobe of the transmitting beam. The result is that three lines of acoustic echo data are obtained on each transmit-receive cycle. In general, there may be n echo signals per transmitted beam, and the echo signals as well as the transmitted beam are steered so that the angles have equal tangent increments.

FIG. 2 shows the format of the input sector geometry according to the invention by which the physical locations of the input echo data to the scan converter are related to those of the output data of the scan converter in a simple way compatible with delay along a conventional television raster. Acoustic scan lines are indicated by numbers 1–11, and echo data samples along the scan lines are illlustrated as solid dots and indicated by letters a–r. The scan angles $\theta$ on either side of the normal through origin point 0 are chosen to have equal tangent increments, and the acoustic scan lines intersect a lateral line perpendicular to the normal at equal increments. Along each of these scan lines, the echo amplitude signal is sampled at a rate which varies inversely with the cosine of the angle of the scan line. With the x and z coordinates defined as in FIG. 2, the echo signal is sampled at a rate that varies with the scan angle so that corresponding samples are taken at the same value of the z-axis coordinate. To emphasis that the echo data samples are arranged in rows or raster lines parallel to one another and the linear transducer array, data samples in three of the raster lines are circled. Within each raster line the echo data samples are equally spaced, and in the z direction the raster lines are also equally spaced. For small values of z near the sector origin point 0, where the data samples come very close together, it is permissible to skip over some of the samples provided the actual sample rate stays above the Nyquist limit.

After being sampled and converted to digital form by an analog-to-digital converter, the echo data samples are buffered and stored in a digital memory having a matrix of storage cell locations in columns and rows. FIG. 3 shows a random access memory 15 preferably made with MOS (metal oxide semiconductor) field effect transistors or bipolar transistors, and in such memories storage cell locations are accessed for the writing in and reading out of echo data by the coincidence of signals on X select lines 16 and Y select lines 17. Digitized echo data samples along successive scan lines 1-11 are stored in adjacent columns of random access memory 15, and a typical pattern of stored data is depicted by solid dots. The sequence of accessing memory columns for the storage of echo data follows the sequence of generating transmitted acoustic beams. For example, one sequence is that transmitted beam 1 is produced and the time delays progressively changed to rotate the transmitted beam in the clockwise direction and produce beams 2-6, then transmitted beam 11 at the other side of the normal is generated and the time delays progressively changed to rotate the beam in a counterclockwise direction and produce beams 10-7. The density of stored echo data along raster lines a-r increases with distance from the sector origin point, and vacant storage cell locations are intentionally skipped to keep readout of the output data from the scan converter within reasonable rates. With this exception, the entire memory is available for the storage of echo data, as contrasted to prior art scan converter memories wherein data is stored in a sector pattern so that a large percentage of storage cell locations are never used.

Whereas input echo data is written into the digital memory column by column, stored data is read out of memory row by row in sequence. Further processing of the read-out memory data, however, is required to convert the rectangular grid memory format to sector image format. The post-processing electronics is illustrated in simplified form in FIG. 4. Assuming that readout from memory begins at raster line or row r, the data samples are read into a buffer storage device such as an n-stage shift register 20. Data is clocked out of shift register 20 to an output digital-to-analog converter 21 at a variable rate corresponding to the width of the sector at that raster line or value of z (see FIG. 2). In addition to varying the shift register clocks, so that the sector geometry is obtained, it is also necessary for the control circuitry 22 to delay the start of the clock pulses by varying amounts on each raster line. As readout from memory proceeds from raster line r toward raster line a, the frequency of clock pulses increases and the time delay also increases, which is dependent on the location of the edge of the sector at the row or raster line being read out from a reference line such as the edge of the television screen. The clock rate can reach a maximum and can be approximately the same at raster lines near the sector origin, made possible by skipping input sampling points. The stream of echo data is presented to a low pass filter 22 before being fed out as a video signal or Z control for varying the electron beam intensity of the cathode ray tube. The purpose of filtering is to smooth out the step staircase function at the DAC output. Echo data for a raster line is clocked out of shift register 20 at TV rates, and in a conventional television monitor the time for the electron beam to scan across a single line and retrace itself is 63 microseconds.

The preferred embodiment in FIG. 5 of the complete digital scan converter can now be explained. As was mentioned, for every transmitted acoustic beam there are three focused received echo electrical signals from which three image scan lines on the television screen can be derived. These ultrasound echo signals are the outputs of the three summing amplifiers in FIG. 7 which are supplied to the scan converter. Input analog-to-digital converters 25a-25c sample the respective input amplitude signals under control of a frequency synthesizer 26 at a rate which varies inversely with the cosine of the angle of the scan line. It is permissible for frequency synthesizer 26 to operate on the basis of multiplying a base frequency by a rational fraction, because some frequency error can be tolerated. This means that the data sampling points in FIG. 2 along the several scan lines may not be exactly at the same z-coordinate. The digitized data samples, having 8 bits each in the example being given, are fed to a first-in-first-out input data buffer such shift registers 27a-27c. Data samples stored temporarily in the three shift registers are clocked out successively by a buffer control 28 into a common memory input bus 29.

The random access memory can be made from the Type 2102 Solid State Memory Chip available commercially from a number of manufacturers including Intel Corp. and National Semiconductor Corp. This is a 32 K×8-bit memory divided into four 8 K×8 bit memory banks or segments 30A-30D, each with a matrix of 45×180 storage cell locations. The cycle time for this memory is 450 microseconds, and to achieve the object of real time imaging four echo data samples, one per segment, are written into memory simultaneously and four data samples are read out simultaneously. Improved operation is attained by making one-half of the memory cycles available for read in purposes and one-half for readout which occurs in apparently simultaneous manner. If the sector is displayed during 30 microseconds out of a possible 50 microseconds, there will be ample time for both functions since each scanning line including retrace is 63 microseconds. Thus, a burst mode in which writing occurs for 30 microseconds and reading occurs for 30 microseconds is appropriate.

To simultaneously write four consecutively digitized echo data signals from a scan line into the four memory segments 30A-30D, input bus 29 is connected directly to segment 30A, through one unit delay element 31 to segment 30B, through two such delay elements to segment 30C, and through three of the delay elements to segment 30D. In each group of four data samples, the first three samples are delayed by variable amounts and the last has a zero delay so that the four samples can be written into the accessed storage cell locations at the same time. During the available 30 microseconds for read in as many data samples as can be processed during this time are entered into the four memory banks. Whenever data for a complete scan line is emptied out of one of shift registers 27a–27c, data is clocked out of the next input shift register in sequence. The sequence of storage cell location addresses that controls where each sampling point is stored, as well as the readout sequence, are stored in memory address sequence read-only memories 32. ROMs 32, buffer control 28, and frequency synthesizer 26 are controlled by a control and timing unit 33 which can be part of the master digital controller in FIG. 7. The memory addresses read out of ROMs 32 is 56-bit data, 14 bits for each memory segment.

Stored echo amplitude data is read out simultaneously from memory segments 30A–30D into four separate shift registers 34A–34D, one per memory segment. These can be 64×8 bit shift registers. To clock out data samples temporarily stored in the shift registers at a rate corresponding to the width of the sector at the raster line being read out, an output frequency synthesizer or variable clock 35 is provided for generating clock pulses which are gated at the proper time to shift registers 34A–34D by counter and gate circuitry 36. The clock rate at raster line r is, for instance, 6 MHz and at line h is 12 MHz. The counters delay the start of the clock pulses by varying amounts on each raster line, dependent on the distance from the edge of the screen to the beginning of the raster line being read out, and are operative to count down and open a gate at a predetermined count to let the clock pulses through and then close the gate at another point as the count continues. The counter is reset, ready for the next cycle of operation. The parameters controlling the frequency synthesizer and the counters and gates are loaded from output frequency synthesizer and counter read-only memories 37 that in turn are controlled by control and timing unit 33. Digital data samples read out in parallel from the four shift registers are presented to a multiplexer 38, and at the output the data samples are in serial groups of four containing one sample from each shift register. After the data samples are passed through digital-to-analog converter 39 and low pass filter 40, the resulting video signal is fed to the cathode ray tube.

Figure 6:
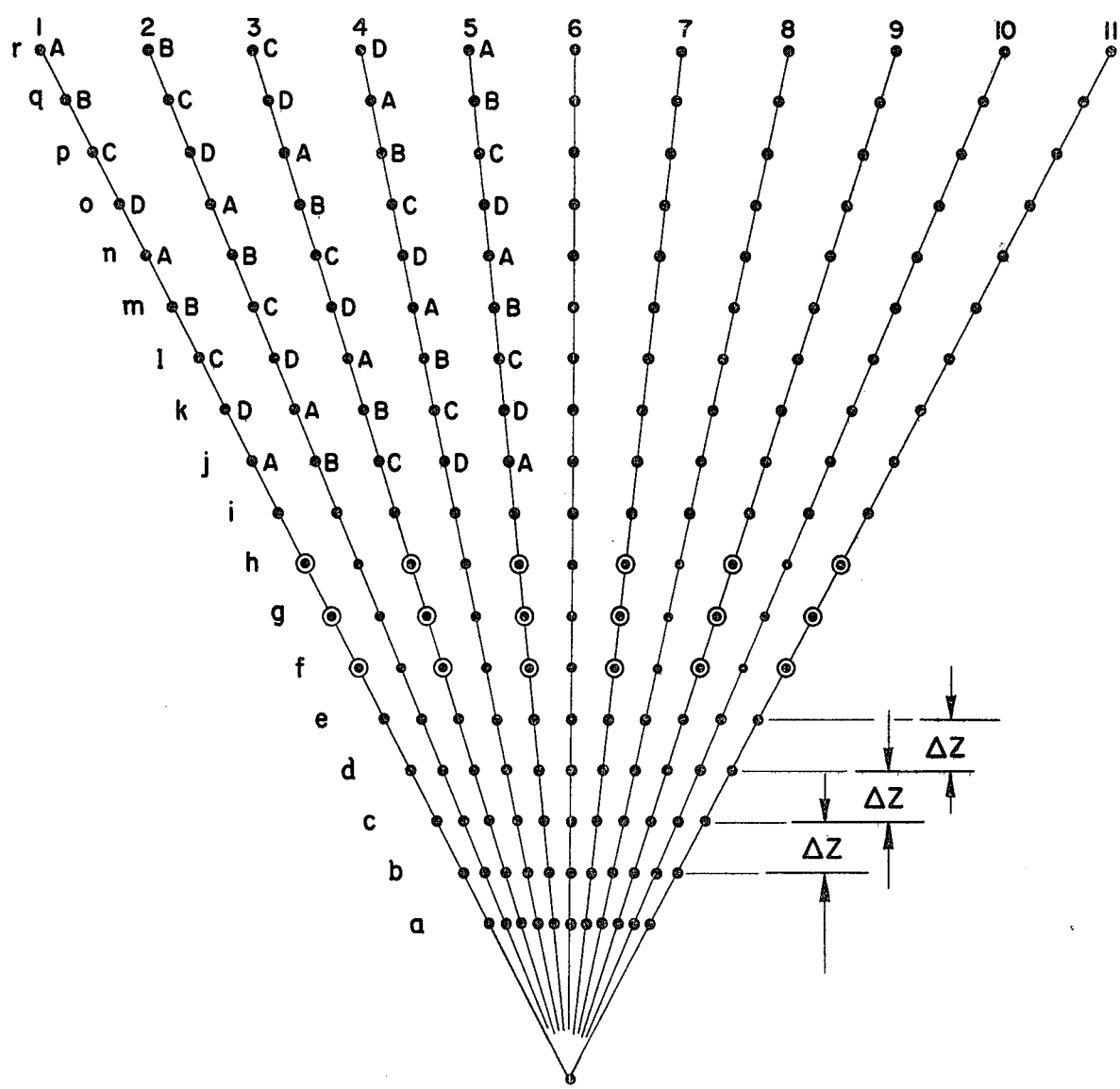
FIG. 6 illustrates the input sector geometry as in FIG. 2 with an addition to facilitate explanation of the sequence of writing into and reading echo amplitude data out of the four-segment random access memory in FIG. 5.

In order to realize the method of operation just discussed as to FIG. 5, the pattern of storing echo data samples in the memory segments or banks is shown in FIG. 6. Letters A–D adjacent the scan lines and the sampling points, indicated by solid dots, designate that the data samples are stored in memory segments 30A–30B. Looking at raster line j, it is seen that the sequence across the row is A, B, C, D, A, etc. This is the proper sequence for reading out stored data in parallel from memory segments 30A–30D. To get this arrangement of stored data, it is necessary to precess the memory addressing of the memory segments from one scan line to the next. Along scan line 1, data samples for raster lines A–D are stored in the order D, C, B, A; along raster line 2 the order is A, D, C, B; and so on, as directed by buffer control 28. Another aspect of alternately reading into memory at 30 microseconds intervals, or one-half of the memory cycle, is as follows. Less than one full frame of image pixels on the television screen is changed at any one time, and therefore there is a ripple effect from one frame to the next, resulting in improved picture quality. Stored echo data is read out of a memory row at a time determined by the memory address sequencing, and whatever data is there is read out whether it be newly updated data or "old" data.

FIG. 7 is a system block diagram of the single sector scanner ultrasonic imager incorporating the digital scan converter according to the invention. The linear transducer array is illustrated with only three transducer elements 43a–43c, but in practice the array has a larger number of transducer elements. The three transmitting and receiving channels 44a–44c are each comprised by level and timing control circuitry 45 under the control of master digital controller 46 for determining the level and timing of a transmit pulse generated by transmit pulser 47 and applied to one of the transducer elements. The receiving channel for processing the received echo electrical signal is comprised of a preamplifier 48 having a limiter to protect the sensitive preamplifier inputs from the high transmitting voltage, and a compression amplifier 49 to reduce the larger dynamic acoustic range to the smaller range a cathode ray tube display device can handle. The amplified echo signal is next fed in parallel to three digitally selected analog delay circuits 50, 50' and 50" having an associated delay select switch matrix 51, 51' and 51" which, under the control of digital controller 46, selects the delay element or elements to focus the echo signal in the three delay channels. For each transmitted acoustic beam, it is recalled, there are three different focused echo signals within the lobe or angle of the transmitted beam. The other two receiving channels are identical except for the values of the time delays employed. Digital controller 46 can take various forms and can be a hard-wired logic circuit, but is preferably a properly programmed minicomputer or microcomputer. In operation, transducer excitation pulses are generated by the three transmitting channels in time sequence to steer the generated ultrasound beam and control the scan angle. The received echo signals are time delayed by different preselected amounts in the three receiving channels, and in the three delay channels within each of the receiving channels. The delayed echo signals from the three analog delay circuits 50, one per receiving channel, are fed to a summing amplifier 52; and the delayed echo signals from the three delay circuits 50' are summed by summing amplifier 52', and those from delay circuits 50" are summed by summing amplifier 52". The three focused ultrasound echo signals at the summing amplifier outputs are now processed through digital scan converter 53 to convert the sector scan format to raster scan format as here described. The scan converter also controls sweep drivers 54 and the generated X and Y deflection signals for cathode ray tube 55 on which is displayed, in real time, the single sector image. The order of generating transmitted acoustic beams is fixed and is preset by digital controller 46, which supplies coordinating information to the scan converter.

The components of the digital scan converter can be standard integrated circuits or conventional circuitry as is presently known in the art. With appropriate modifications that will be apparent, the scan conversion apparatus and method of converting ultrasound echo signals are also applicable to the multi-sector scanner ultrasonic imaging system described in Rocha and Thomas application Ser. No. 825,528. This application may be referred to for additional information on single-sector scanners and specific transmitting and receiving channel circuitry that can be used to practice the invention.

Also, the digital echo output data can be transferred to a storage medium like floppy disks for permanent storage for display at a later time.

In summary, the method of scan conversion comprises generating input digital echo data representing received echo amplitudes at sampling points along scan lines angulated at angles on either side of the normal having substantially equal tangent increments, the sampling points on each scan line being taken at the rate which varies inversely with the cosine of the scan angle whereby the sampling points are along lateral raster lines perpendicular to the normal. Digital echo data is written scan line by scan line into a memory having a matrix of storage cell locations in columns and rows, but the stored data is read out of memory raster line by raster line. The read-out digital echo data is then processed to generate output data at a rate dependent upon the width of the sector at the raster line and delayed in time dependent on the location of the edge of the sector from a reference line. Memory is required only in the amount needed to store the input data. In the preferred embodiment of FIG. 5, a 32 K×8 bit memory provides a display covering approximately 400 lines of 300 picture elements each (120 K).

While the invention has been particularly shown and described with reference to several preferred embodiments thereof, it will be understood by those skilled in the art that various changes in form and details may be made therein without departing from the spirit and scope of the invention.

The invention claimed is:

1. An ultrasonic imaging system incorporating a scan converter for the conversion of echo signals in sector scan format to raster format for display comprising:
   means for sequentially generating pulses of ultrasound that are transmitted along multiple scan lines on either side of the normal having substantially equal tangent increments to perform a sector scan and for detecting received echoes and producing focused echo signals;
   means for sampling and converting the focused echo signals to digital echo amplitude data at rates which vary inversely with the cosine of the angle of the scan lines, whereby sampling points are along lateral raster lines perpendicular to the normal and are equally spaced in each raster line;
   a digital memory having a matrix of storage cell locations in columns and rows each corresponding to a sampling point;
   means for writing the digitial echo data for one scan line into a column of said memory and for sequentially writing the digital echo data for other scan lines into adjacent columns of said memory, and means for reading out the stored echo data row by row into an output buffer storage;
   means for serially reading out the digital echo data from said output buffer storage at a variable rate dependent on the width of the sector at the raster line being read out and delayed in time dependent on the location of the edge of the sector from a reference line; and
   means for converting the digital data read out of said output buffer storage to analog data to produce a video signal for controlling the electron beam intensity of a cathode ray tube.

2. The combination of claim 1 further including means for low pass filtering the analog data samples before being fed to the cathode ray tube.

3. The combination of claim 2 wherein said output buffer storage is comprised of at least one shift register operated at a variable clock rate for readout, and an input buffer storage comprised of at least one shift register for temporarily storing said digital echo amplitude data before reading into memory.

4. The combination of claim 2 wherein said memory is divided into a plurality of segments of storage cell locations and said output buffer storage is comprised of a plurality of shift registers operated at a variable clock rate for readout and each coupled to one of the memory segments.

5. The combination of claim 4 further including an input buffer storage for temporarily storing the digital echo data before writing into said memory, delay elements connected in series between said input buffer storage and said memory segments to facilitate parallel writing into said memory segments, and a multiplexer between said output buffer storage shift registers and said means for converting the read-out data samples to analog data samples.

6. A method of generating ultrasound echo signals in sector scan format and converting to raster format for display comprising the steps of:
   performing a sector scan and sequentially generating focused ultrasound echo signals representing echo amplitudes along multiple scan lines at angles on either side of the normal having substantially equal tangent increments;
   sampling the focused echo signals at rates which vary inversely with the cosine of the angle of the scan line and converting the samples to digital echo amplitude data;
   writing the digital echo data for one scan line into a column of a random access memory having a matrix of storage cell locations in columns and rows, and sequentially writing the echo data for other scan lines into adjacent columns of said memory such that the digital echo data stored in memory rows are along lateral raster lines through the sector perpendicular to the normal;
   reading out the stored digital echo data in said memory row by row, and processing the readout echo data raster line by raster line to generate output digital echo data at a variable rate dependent upon the width of the sector at the raster line and delayed in time dependent on the location of the edge of the sector from a reference line; and
   converting the output digital echo data to analog echo data to be fed to a television monitor to control the electron beam intensity.

7. The method of claim 6 wherein the step of sampling focused echo signals and writing echo data into memory comprises skipping preselected echo data near the sector origin so that processing of readout echo data does not exceed a predetermined maximum rate, and the additional step of low pass filtering said analog echo data to produce a video signal.

8. The method of claim 7 wherein the steps of writing into memory and reading out of memory are performed in burst mode alternately writing in and reading out.

* * * * *